US009778028B2

(12) United States Patent
Corella et al.

(10) Patent No.: US 9,778,028 B2
(45) Date of Patent: *Oct. 3, 2017

(54) NON-ADJUSTABLE POINTER-TRACKER GIMBAL USED FOR DIRECTED INFRARED COUNTERMEASURES SYSTEMS

(71) Applicant: BAE Systems Information and Electronic Systems Integation Inc., Nashua, NH (US)

(72) Inventors: Armando Corella, Azusa, CA (US); Lynne F. Buzdar, Placentia, CA (US); Ronald A. Gidseg, Pasadena, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,019

(22) Filed: Mar. 10, 2016

(65) Prior Publication Data

US 2016/0187125 A1  Jun. 30, 2016

Related U.S. Application Data

(60) Division of application No. 13/506,901, filed on May 23, 2012, now Pat. No. 9,310,191, which is a
(Continued)

(51) Int. Cl.
*G01B 11/26* (2006.01)
*G01S 3/78* (2006.01)
(Continued)

(52) U.S. Cl.
CPC ............ *G01B 11/26* (2013.01); *G01S 3/7803* (2013.01); *G01S 3/786* (2013.01); *G01S 7/495* (2013.01); *G02B 7/1827* (2013.01)

(58) Field of Classification Search
CPC ........ F41G 7/001; F41G 7/224; F41G 7/2246; F41G 7/2253; F41G 7/229; G01S 7/499; G01S 7/4818; G01S 7/495; G01S 7/497
See application file for complete search history.

(56) References Cited

U.S. PATENT DOCUMENTS

| 2,949,030 A | 8/1960 | Horsfall, Jr. et al. |
| 3,729,152 A | 4/1973 | Stephenson |

(Continued)

OTHER PUBLICATIONS

Titterton, Strapdown Inertial Navigation Technology, 2004, second edition, vol. 207, The American Institute of Aeronautics and Astronautics—Reston, VA, and The Institution of Electrical Engineers—Herts, UK; pp. 441-547.
(Continued)

*Primary Examiner* — Luke Ratcliffe
(74) *Attorney, Agent, or Firm* — Scott J. Asmus

(57) ABSTRACT

In a directed infrared countermeasure system, to assure parallelism between the line-of-sight to a target and the output beam, the input and output mirrors are fixedly attached to a uni-construction arm mounted to a rotatable azimuth platter to which internal mirrors are also fixedly attached. A system is provided for zeroing out alignment errors by developing an aim-point map for the gimbal that records initial alignment errors induced by manufacturing tolerances and uses the aim-point map error values to correct the output mirror orientation. The system also corrects for alignment errors induced by thermal gradients.

6 Claims, 10 Drawing Sheets

Related U.S. Application Data continuation of application No. 13/373,775, filed on Nov. 30, 2011, now abandoned, which is a continuation of application No. 12/499,584, filed on Jul. 8, 2009, now abandoned.

(60) Provisional application No. 61/134,277, filed on Jul. 8, 2008.

(51) Int. Cl.
*G01S 3/786* (2006.01)
*G01S 7/495* (2006.01)
*G02B 7/182* (2006.01)

(56) References Cited

U.S. PATENT DOCUMENTS

| | | | |
|---|---|---|---|
| 4,010,365 A | 3/1977 | Meyers et al. |
| 4,024,392 A | 5/1977 | Teppo et al. |
| 4,068,538 A | 1/1978 | Butler et al. |
| 4,123,134 A | 10/1978 | Meyers |
| 4,315,610 A | 2/1982 | Malueg |
| 4,324,491 A | 4/1982 | Hueber |
| 4,396,878 A | 8/1983 | Cole et al. |
| 4,404,592 A | 9/1983 | Pepin et al. |
| 4,520,973 A | 6/1985 | Clark et al. |
| 4,701,602 A | 10/1987 | Schaefer et al. |
| 4,812,639 A | 3/1989 | Byren et al. |
| 4,949,917 A | 8/1990 | Cottle, Jr. et al. |
| 4,973,013 A | 11/1990 | Klaus, Jr. |
| 5,052,637 A | 10/1991 | Lipps |
| 5,072,890 A | 12/1991 | Klaus, Jr. et al. |
| 5,088,818 A | 2/1992 | Nicholson |
| 5,127,604 A | 7/1992 | Klaus, Jr. et al. |
| 5,202,695 A | 4/1993 | Hollansworth et al. |
| 5,219,132 A | 6/1993 | Beckerleg et al. |
| 5,557,347 A | 9/1996 | Johnson |
| 5,557,526 A | 9/1996 | Anderson |
| 5,742,384 A | 4/1998 | Farmer |
| 5,791,591 A | 8/1998 | Hoban |
| 6,021,975 A | 2/2000 | Livingston |
| 6,021,976 A | 2/2000 | Exter |
| 6,129,307 A | 10/2000 | Deoms et al. |
| 6,326,759 B1 | 12/2001 | Koemer et al. |
| 6,396,233 B1 | 5/2002 | Christison et al. |
| 6,704,607 B2 | 3/2004 | Stone et al. |
| 6,836,320 B2 | 12/2004 | Deflumere et al. |
| 7,136,726 B2 | 11/2006 | Greenfield et al. |
| 7,180,720 B2 | 2/2007 | Ichimura |
| 7,308,342 B2 | 12/2007 | Greenfield et al. |
| 7,333,064 B1 | 2/2008 | Timothy et al. |
| 7,378,626 B2 | 5/2008 | Fetterly |
| 7,688,247 B2 | 3/2010 | Anschel et al. |
| 8,527,115 B2 | 9/2013 | Greenfield et al. |
| 2003/0142005 A1 | 7/2003 | Bar-Avi et al. |
| 2004/0233420 A1 | 11/2004 | Deflumere et al. |
| 2007/0075182 A1 | 4/2007 | Fetterly |
| 2007/0206177 A1 | 9/2007 | Anschel et al. |
| 2011/0268453 A1* | 11/2011 | Fest ............... F41G 7/001 398/129 |
| 2015/0061565 A1 | 3/2015 | Corella |

OTHER PUBLICATIONS

Corella, Gimbal Stability Investigation, IRCM Pomona EOS, Jun. 14, 2002.
BEI Systron Donner Inertial Division, Bei Gyrochip Model QRS11 product literature, BEI Technologies, Inc., Concord, CA.
Muradian, Little Chip, Big Problems, DefenseNews, Nov. 24, 2003, vol. 18, No. 44.
Firoiu, Scaling MANETs using Long-Range Radios and Protocol Adaptation, BAE Systems' Techology Solutions, Burlington, MA.
U.S. Appl. No. 13/506,901, filed May 23, 2012.
U.S. Appl. No. 13/373,775, filed Nov. 30, 2011.
U.S. Appl. No. 12/499,584, filed Jul. 8, 2009.
U.S. Appl. No. 12/460,014, filed Jul. 8, 2009.
Statement by Robert K. Tendler, dated Oct. 25, 2012, 6 pages.

* cited by examiner

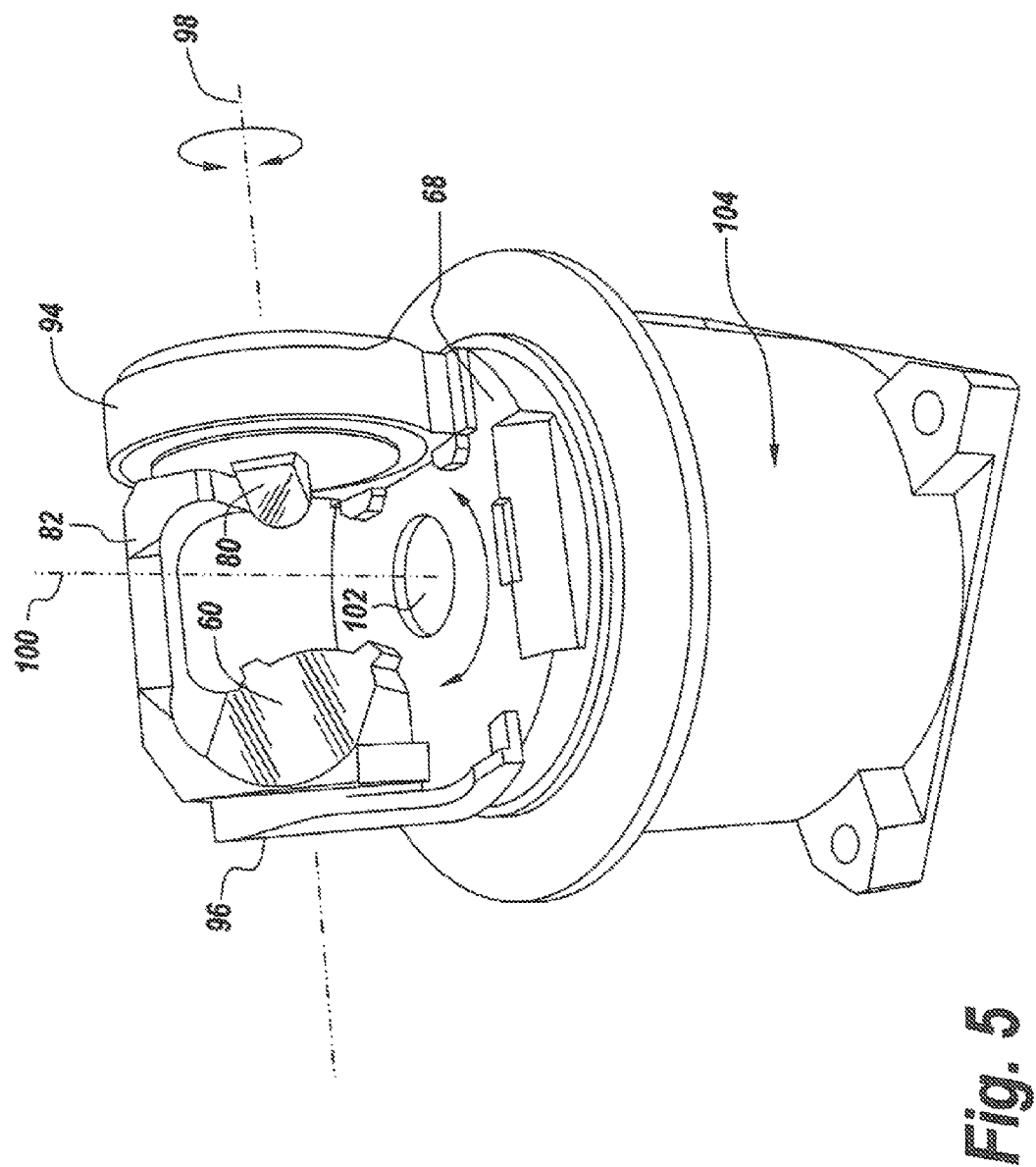

NON-ADJUSTABLE POINTER-TRACKER GIMBAL USED FOR DIRECTED INFRARED COUNTERMEASURES SYSTEMS

RELATED APPLICATIONS

This Application is a divisional of U.S. patent application Ser. No. 13/506,901 filed May 23, 2012 and is a continuation of co-pending U.S. patent application Ser. No. 13/373,775 filed Nov. 30, 2011 which is a continuation of U.S. patent application Ser. No. 12/499,584 filed Jul. 8, 2009. This Application claims the benefit under 35 USC §119(e) from U.S. Application Ser. No. 61/134,277 filed Jul. 8, 2008, the contents of which are incorporated herein by reference.

FIELD OF THE INVENTION

This invention relates to directed infrared countermeasures and more particularly to a non-adjustable pointer-tracker gimbal for use in such systems.

BACKGROUND OF THE INVENTION

In directed infrared countermeasures (DIRCM) systems there has always been a problem of making the line-of-sight (LOS) to the target and the laser beam that is emitted from the DIRCM head coincident or parallel. While there have been many efforts to reduce the amount of parallax between the two and therefore reduce the aiming errors of the outgoing laser beam, the difficulty in the past has always been with the multiple mirrors that are utilized both for positioning the received image at the center of a focal plane array and for directing the laser beam out the DIRCM head.

In typical alignment procedures the multiple mirrors in the DIRCM head involve individual and independent adjustments. While it is possible for one pointing direction to adjust out the parallax by adjusting all the mirrors, the adjustment does not correct for all pointing directions. Since these mirrors move independently, the positional errors of the mirrors add up and are not easily compensated for over the entire field of regard. The situation is even further complicated as to how to lock the adjustment mechanisms without moving the adjustment while at the same time retaining boresight in view of the harsh environment.

Thus, in a cut and try operation one can spend an inordinate amount of time trying to compensate for the positional errors of these mirrors for all pointing directions; but in general these efforts have not met with success.

It is required that the angular error between the line-of-sight to the target and the laser path be extremely accurate and not exceed the laser divergence. There are a number of accumulated tolerances that must be compensated for i.e. mirror and support inaccuracies, focal plane array mounting inaccuracies, and gimbal fabrication tolerances. An objective in some DIRCM designs is to ensure that parallax allocation between the line-of-sight to the target and the laser beam path is less than 200 microradians, which is an exceedingly aggressive requirement. It is even more daunting because of the independent movement of the mirrors involved, noting that the angular errors accumulate for the various pointing directions. Moreover, compensating these mirrors for a single direction does not compensate the system for the entire field of regard.

There is therefore a need for a simplified gimbaling system that assures that if one detects the target image that appropriate movement will occur to insure the laser will in fact illuminate the target with laser energy and not miss it.

It would be noted that for gimbals the first step for the gimbal and the mirrors associated with it in a semi-spherical field of regard is to reflect the target image through a telescope and onto a focal plane array which is sensitive to the desired spectrum of light. The telescope not only focuses the target image but provides the means to measure angular displacement. Once the image is received on the focal plane array the displacement from the center is calculated and interpreted into angular displacement. This angular displacement is used to drive the azimuth and elevation stages of the gimbal, and associated mirrors, to drive the target image to the center of the focal plane array. Once the image is in the center of the focal plane array the laser is fired, with the assumption that the laser beam is parallel to the line-of-sight to the incoming image. This is where the problem arises. If there is error in parallax beyond the divergence of the laser beam the energy will not hit the target and the missile may not be jammed.

In one particular DIRCM system the head housing the gimbal is stable and the camera is fixed to the head. The result is that all of the pointing is done with movable mirrors. Note that the mirrors in the past have been adjustable with respect to the housing to which the camera is fixedly attached.

Once the target image reaches the camera, this target image is imaged onto a focal plane array so that the image is a particular spot within the field of view. The mirrors associated with acquiring the target image are physically moved so that the image spot is moved to the center of the focal plane array as described above.

Once the mirrors have centered the image at the center of the focal plane array, the laser is fired such that the direction of the laser beam corresponding to the center point of the array goes out coincident with or parallel to the line-of-sight to the target. If there were no pointing errors, then the outgoing laser beam would be coincident with or parallel with the line-of-sight to the target, and the laser beam would hit the target.

However, and as described above, it is difficult or impossible to post align the incoming image with the exiting laser beam after the gimbal has been assembled due the accumulation of errors throughout the assembly especially since a high degree of accuracy is required. This is where a simple and accurate system must be implemented to insure DIRCM functionality.

SUMMARY OF THE INVENTION

Rather than trying to adjust all of the mirrors and affiliated hardware in the DIRCM head or gimbal to compensate for all pointing errors, in the subject case the input and output mirrors are mounted to a rigid uni-construction elevation arm that is part of an elevation stage and are initially fabricated to reasonable tolerances. The subject system does not try to adjust the mirrors for every pointing direction, rather deals with the original unadjusted alignment of the mirrors and provides a system to compensate the aiming direction of the laser by adjusting the azimuth and elevation stages with an offset determined during an initial calibration procedure to bring the outgoing laser beam as close as possible to being parallel to the line-of-sight to the target. With this parallelism, the result is that the laser beam hits the target with maximal energy on target.

The above offset adjustment is done by moving the elevation arm and an azimuth platter on which all of the apparatus is mounted in accordance with the errors determined in an initial calibration procedure.

In one embodiment, manufacturing tolerances or errors are determined by a series of system calibration techniques. These error solutions are placed into a software look-up table which is referred to as an aim-point map. The intent is to drive the azimuth and elevation stages to position the target image at the center of the focal plane array taking into account the offset given by the look-up table.

Once the target has been located on the gimbal's focal plane array, the image position or displacement relative to the center of the focal plane array is calculated. The image displacement is corrected by values from the aim-point map with the corrected displacement used to drive the gimbal's azimuth and elevation stages redirecting the laser beam to strike the target. As a result, the above process places the laser beam on target by shifting the laser beam to be as parallel as possible to the line-of-sight to the target. As used herein, line-of-sight refers to the line-of-sight to the target, not the line-of-sight of the gimbal.

Since the mirrors and mechanical mechanisms are fixed in which no adjustments can be made, the laser beam and target image are shifted together so that after the elevation and azimuth stages are driven, the image is no longer in the center of the focal plane array and the electrical center of the focal plane array is shifted by this amount.

In one embodiment, the initial calibration procedure involves rotating a DIRCM head on a rotary table with the gimbal's azimuth axis coincident with that of the rotary table. Thereafter a simulated target is mounted at far-field and an IR reflector is mounted behind the target. Then the system initiates a sequence to "track" to the target and fire the IR laser at a predetermined azimuth and elevation coordinate.

As indicated above there are a number of factors involved in assessing accuracy requirements and these same factors determine calibration increments. In one embodiment, the DIRCM head is rotated in 5° increments, and measurements are taken of the offset between the target and the position of the reflected laser beam returned to the focal plane array at each increment. These offsets are then stored in an aim-point map look up table. In summary, in an initial alignment procedure the DIRCM head is rotated on a table with a target at a fixed location and a reflector behind the target, and an aim-point map records the error between the line-of-sight to the target and the position of the reflected beam for each pointing direction, with the offset corresponding to this error stored in an aim-point map lookup table accessed by pointing direction.

In operation, once the DIRCM is calibrated, first a target is detected within the field-of-view of the camera and imaged onto the focal plane array. Then the displacement of the target image from the center of the focal plane array is calculated. If there were no tolerances and the mirrors were perfect as regards parallax, the azimuth and elevation stages would move the mirrors so the target image was exactly at the center of the focal plane array and lazing would commence with success. But, due to the above inaccuracies, the aim-point map value at the line-of-sight angle is added to the algorithms that determine how to move the azimuth and elevation stages to place the laser beam on the target Thus, using these aim-point map values, the azimuth and elevation stages are stimulated to correct the position of the output mirror to make the output beam parallel to the line-of-sight to the target and thus assure 200 or better microradian aiming accuracy.

It is a feature of the subject invention that a single member is used to fixedly mount the image or input mirror and the laser or output mirror. This marries the two mirrors to one structural member such that both the input mirror and the output mirror move as one. This member in one embodiment is a uni-construction elevation arm which is rotated about the elevation axis. The elevation arm is in turn mounted to an azimuth platter which rotates the entire structure about the azimuth axis. The critical mirrors rather than being individually controlled are now rotated in unison by the elevation arm and the azimuth platter so that the mirrors are ganged together, and no attempt is made to adjust these mirrors independently as has been done in the past.

Alignment errors for any pointing direction are compensated using the elevation and azimuth stages to move both the input and output mirrors in accordance with the calculated image displacement modified by the offset errors recorded in the aim-point map.

This completely eliminates the problem of trying to independently adjust multiple moving mirrors to provide the precision necessary to accomplish the 200 microradian pointing accuracy for the laser beam. Thus the subject system compensates for manufacturing errors in a software look-up table and permits designing the mirrors and affiliated support mechanisms without adjustments. Additional simplicity is added when the first stage input mirror and the laser output mirror are designed and fabricated as a single part called a uni-construction elevation arm.

Concurrent with the look-up table approach which eliminates or minimizes the effects of manufacturing tolerances, there is also the problem of temperature gradients. As hardware heats and expands or contracts, asymmetrical parts change shape which will affect overall performance, especially pointing accuracy.

In the past hardware designers would try and design symmetrical hardware or select hardware with a common thermal expansion characteristic. However, most of these alternatives are costly and somewhat subjective. The subject system compensates for thermal gradients by firing the laser onto the focal plane array as a reference point and periodically re-firing the laser back onto the focal plane array at the same gimbal position, with any offset being measured and used to adjust the elevation and azimuth stages of the gimbal. This provides an additional calibration factor by providing a reference of how the aim-point of the gimbal changes with varying temperatures. This reference procedure is called boresight alignment and is done periodically to assure alignment.

In summary, a system is provided to assure that the laser beam from a DIRCM head or gimbal places laser energy on the target without complicated adjustments, and expensive parts. This is accomplished by providing a uni-constructed elevation arm with both input and output mirrors fixed to it, and an aim-point map that compensates for all manufacturing tolerances to gain the end objective of jamming heat-seeking missiles. In operation, the position of the output mirror is moved in accordance with target image displacement corrected by the error recorded in the aim-point map to correct the angular orientation of the output mirror for assuring that the outgoing beam is parallel to the line-of-sight to the target. Thermal gradient problems are also compensated by using the sensed gradient-induced errors to adjust aim-point map values.

BRIEF DESCRIPTION OF THE DRAWINGS

These and other features of the subject invention will be better understood in connection with the Detailed Description, in conjunction with the Drawings, of which:

FIG. 5 is a diagrammatic illustration of the fixing of the input mirror and the output mirror to a uni-construction elevation arm;

DETAILED DESCRIPTION

Figure 1:
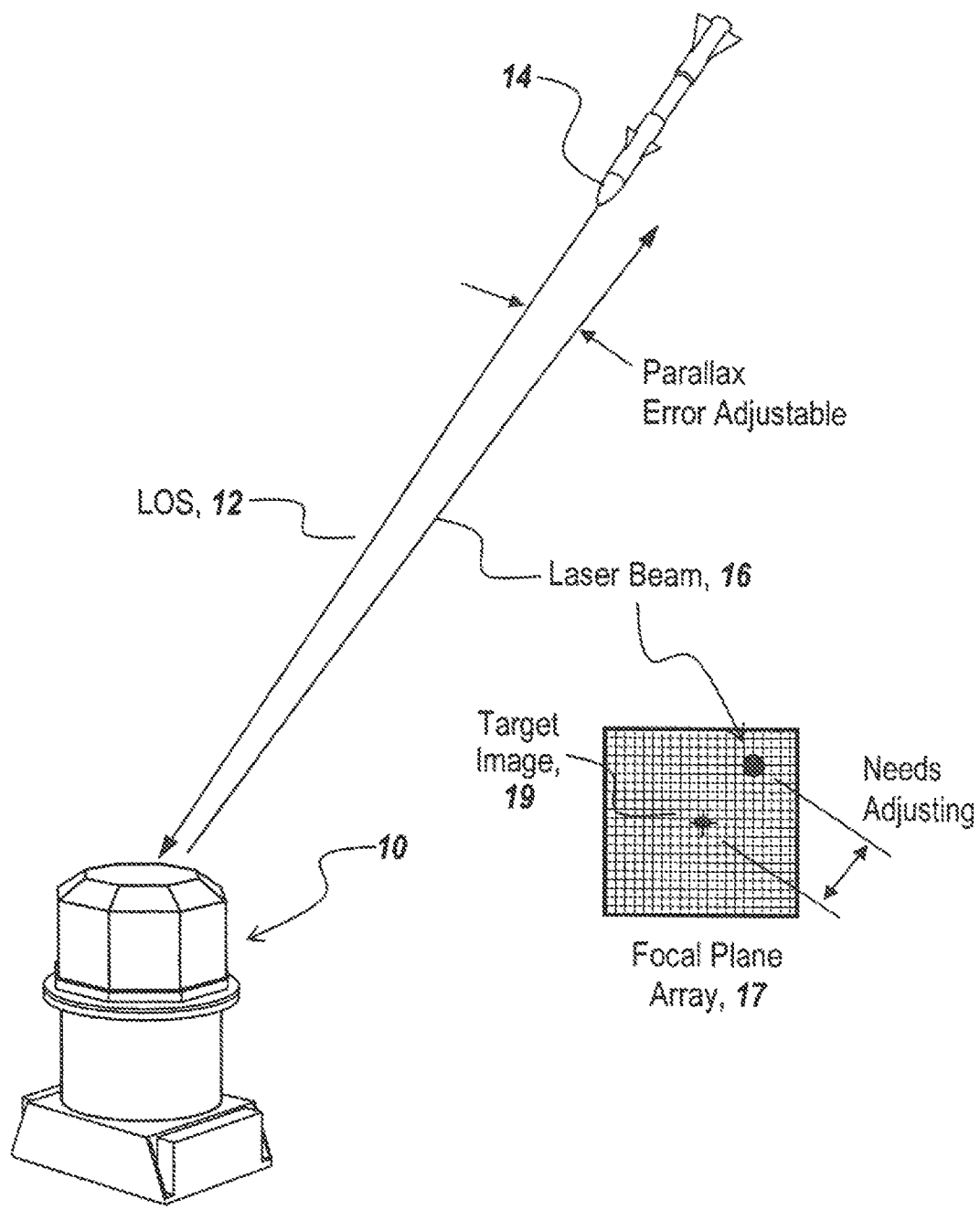
FIG. 1 is a diagrammatic illustration of a directed infrared countermeasures pointer-tracker gimbal illustrating the line-of-sight to a threat such as an incoming missile and a laser beam which misses the missile due to parallax inaccuracy; in which the parallax must be adjusted out by adjusting the mirrors or by using other mechanisms.

Referring now to FIG. 1, a pointer-tracker gimbal 10 is utilized to detect the line-of-sight 12 to a target 14 and aim a laser beam 16 towards the head of the missile.

Pointing accuracies required for such pointer-trackers are substantial. The pointing accuracies required to assure a hit on the target must be less than the total errors within the system, namely in one embodiment a 200 microradian divergence between the line-of-sight to the target and the projected laser beam. As illustrated, the laser beam path 16 and the line-of-sight to the true target 14 must be brought into alignment as would be the case with a coincidence of the back projection of the laser 16 beam with target image 19 on focal plane array 17. This is done by adjustments that must be maintained during the harsh environment of military aircraft.

Figure 2:
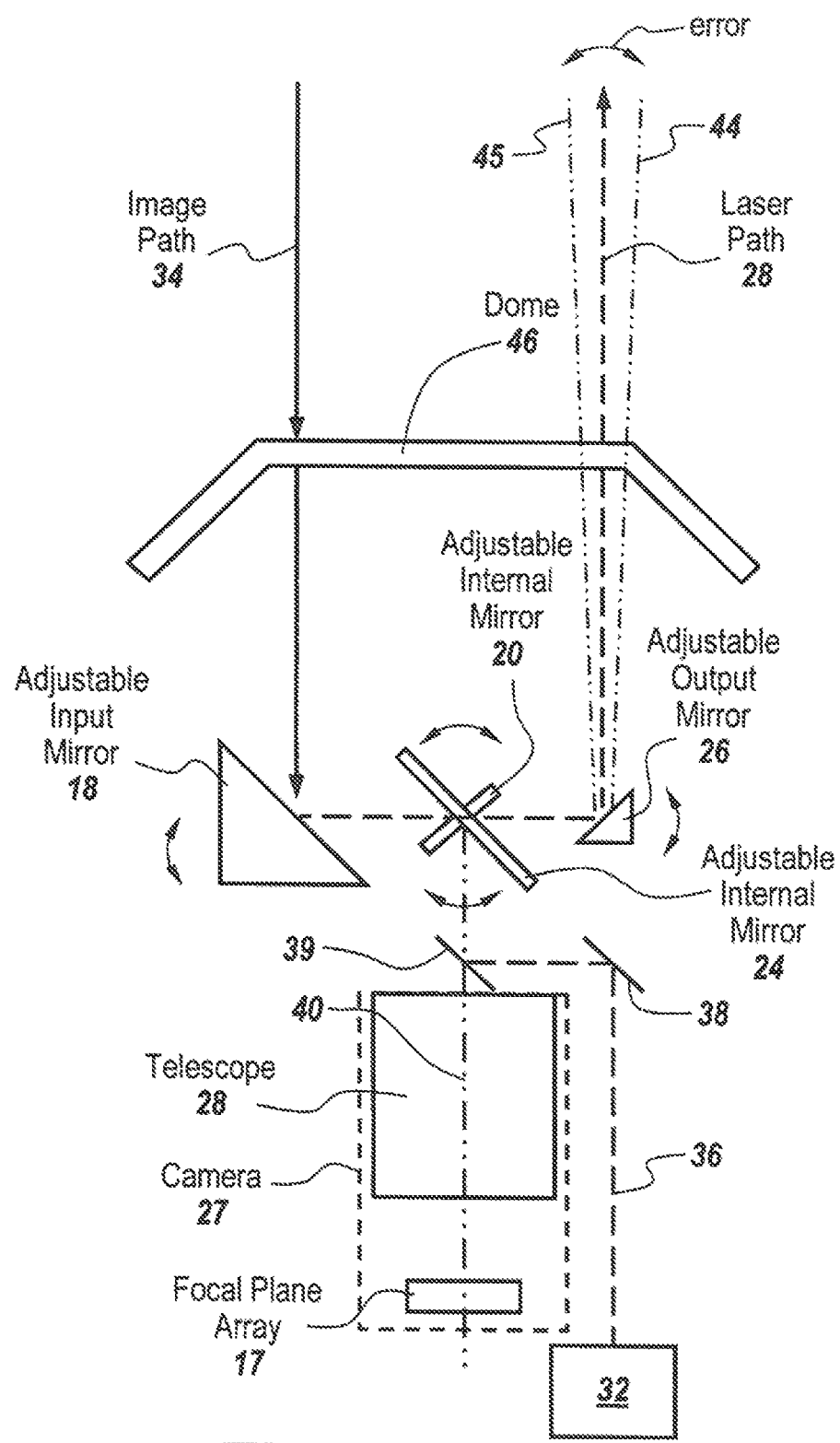
FIG. 2 is a diagrammatic illustration of a pointer-tracker gimbal in which all mirrors, the input mirror, internal mirrors and the output mirror are independently adjustable to compensate for errors between the image path or line-of-sight to the target, and the laser path of the outgoing laser beam to establish parallelism between the two paths, noting the number of potential items needing adjustment.

This stringent requirement in and of itself is extremely difficult to achieve and as shown in FIG. 2, gimbals require individually adjustable mirrors, namely an input mirror 18, a series of internal mirrors 20 and 24, and an output mirror 26 and their affiliated mounting mechanisms. Included in the potential adjustments are laser 32, telescope 28 and focal plane array 17.

The DIRCM head of FIG. 2 utilizes a camera 27 including telescope 28 and focal plane array 17, along with laser 32.

The input path 34, or line-of-sight to the target, is such that the image is redirected at the surface of input mirror 18 towards adjustable internal mirror 24 where it is redirected through telescope 28 onto focal plane array 17. The gimbaling system moves the various mirrors to center the target image at the center of the focal plane array. When this has been achieved a laser beam 36 is redirected by a series of mirrors 38 and 39 so that the output of laser 32 is directed along the centerline 40 of the gimbal or the azimuth axis.

Thereafter, the laser beam is projected along axis 40 and is redirected by adjustable internal mirror 20 towards output mirror 26 where it is redirected along laser path 28.

Note the parallelism of the input path and the laser path are determined by the precise positions of all of the mirrors and mechanical supports involved. Some pointer-tracker gimbals independently adjust some or all of the mirrors to establish this parallelism. As mentioned previously, the adjustment required also includes adjustment of the laser, the camera and any other support mechanisms that influence beam parallelism.

It will be appreciated that the adjustment of mirrors to establish parallelism is a daunting task. The result is that it is only with difficulty that one can adjust the mirrors to make sure that the laser path is parallel with the image path line-of-sight to the target.

More often than not there is an excessive angular error between the line-of-sight input path and the actual direction of the output laser beam as illustrated by dotted lines 44 and 45. As mentioned hereinabove, there is a requirement to provide a much more simple system in order to assure that the laser beam projected out from dome 46 of the gimbal be properly aligned with the line-of-sight to the target, especially to a less than 200 microradian error.

It is also noted that cross coupling errors between the various moving mirrors in the system shown in FIG. 2 are cumulative, which in part explains the difficulty in establishing the parallelism required.

Figure 3:
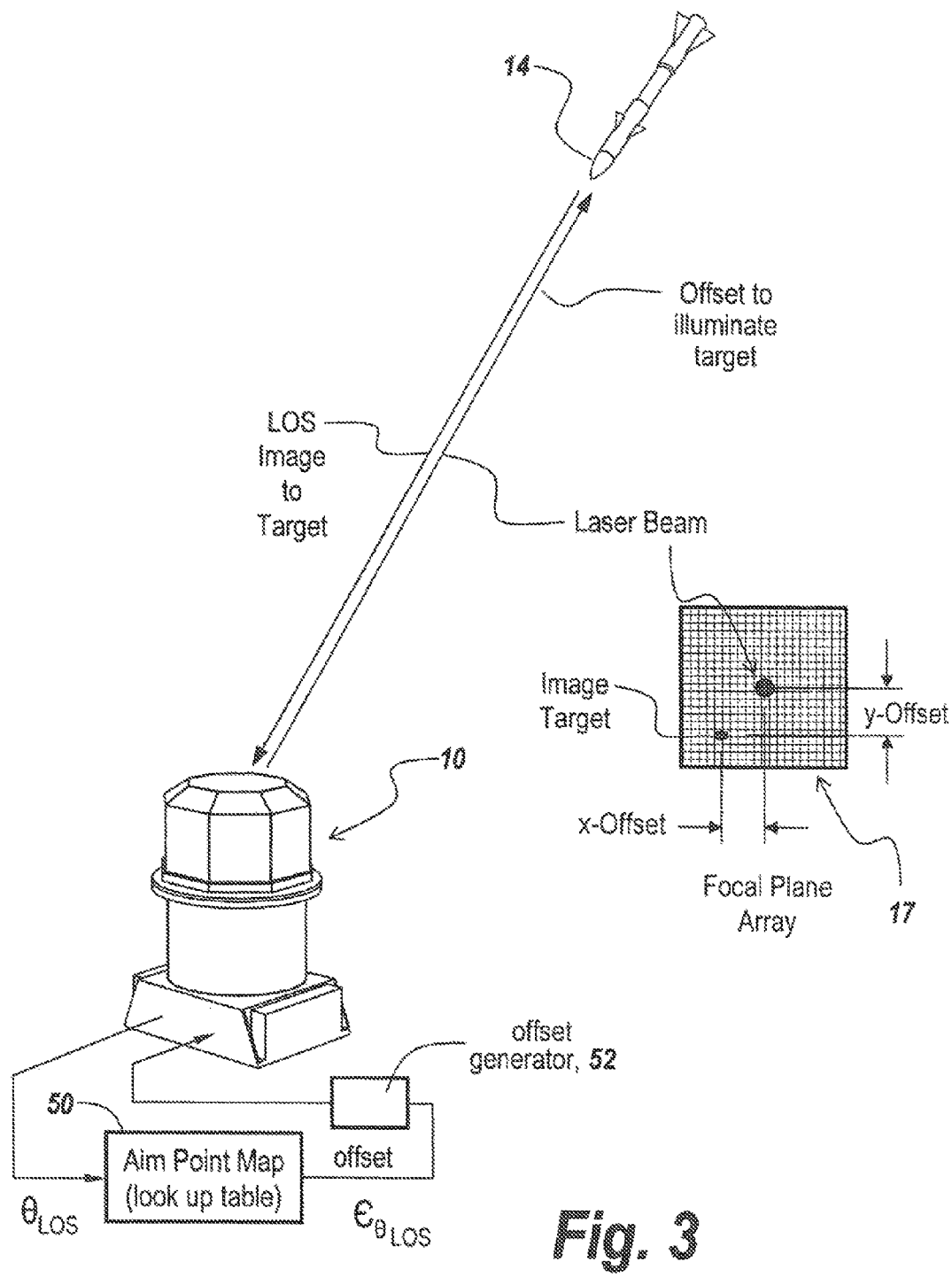
FIG. 3 is a diagrammatic illustration of the subject system using unadjusted mirrors in which all mirrors are affixed to a rigid assembly comprising the elevation and azimuth stages of the gimbal, and in which an aim-point error map lookup table provides an offset through an offset generator for driving the elevation and azimuth stages of the gimbal which offsets the laser beam by the amount specified by the aim-point map to establish laser energy on target.

As illustrated in FIG. 3 and as will be described, gimbal 10 is provided with mirrors that are fixed with no adjustments possible. Rather than trying to adjust each of the individual mirrors to eliminate aiming errors, in the subject system the azimuth and elevation stages are moved to reposition the output mirror by an offset determined by a calibration procedure that results in the generation of an aim-point map 50. Using this map, an offset generator 52 repositions the azimuth and elevation stages of the gimbal to offset the position of the output mirror to place laser energy on target.

As can be seen the position of the laser beam back projected on focal plane array is initially set up to be at the center of the focal plane array. Once acquired, the target image is displaced from the center of the focal plane array by an X and Y offset. To get the laser beam to hit the target, the X and Y offsets are used to move the azimuth and elevation drives. However, due to the tolerance problems mentioned above the X and Y offsets are modified by the calibration values from the aim-point map.

The calibration procedure requires taking the gimbal and mounting it to a rotating table. In one embodiment, the table is rotated every 5° and tracks a fixed target. The laser is fired against a reflective background and the laser image is recorded on the focal plane array. This produces two images on the focal plane array, one the target and the other the laser energy. The X/Y offset is recorded in the aim-point map 50 relative to a specific gimbal angle, and the calibration process is repeated every 5° or to whatever resolution needed.

Thus, the gimbal is rotated in increments to establish the corresponding errors for all of the lines of sight within the field of view of the gimbal.

Therefore, what is established are measured angle-dependant aiming errors. The corresponding offsets for the output mirror are then generated by offset generator 52 for a detected line-of-sight to the target.

In operation, first a target is acquired utilizing an on-board missile acquisition warning system in which fixed cameras located around the periphery of the aircraft look out over a certain field of regard. When a target appears within the field of regard, the coordinates of the target are calculated from the missile acquisition warning system and Euler's equation is used to transpose the coordinates of the target into platform coordinates. Once this has been accomplished, gimbal 10 is slewed over so as to position the target image in the field of view of camera 69 which is used as the "fine track sensor" within gimbal 10.

Having located the target image on the focal plane array of camera 69, the subject system measures the distance from the center of the focal plane array to the target image point. This is done by measuring the displacement of the image from the center of the focal plane array 72 in the X and Y directions. Note that when one measures the X and Y coordinates of the image displacement, one is no longer dealing with the world coordinates or platform coordinates, but rather simply coordinates related to the focal plane array.

Once the displacement from the center of the focal plane array is ascertained, the aim-point map look up table (LUT) 50 is accessed to correct or modify the X and Y coordinates of the image based on the previously established aim-point map errors. These modified X and Y coordinates are then used to stimulate the gimbal motors to move the azimuth and elevation stages, and this is done taking into account the offsets recorded in the aim-point map. This places laser energy on the target by reducing as close to zero the parallax error between the image and laser paths.

Note that the modified X and Y displacements used in this process do not directly relate to motor drive coordinates. Rather, they are rotated with an end point rotation algorithm that is applied when one drives the two motors in the azimuth and elevation directions to the end point established by the measured displacement and aim-point map error correction. Thus for any particular target one looks to the aim-point map to readjust the true aim-point.

In short, the system measures the X and Y displacements from the center of the aim-point map to where the actual image is located on the focal plane array, with these measurements being corrected for the errors from the aim-point map. Noting that both the elevation arm and the azimuth plate have their own drive motors, it is the purpose of the subject invention to stimulate azimuth and elevation drives to reduce the parallax errors.

In one embodiment, there is constant updating commensurate with the frame rate of the camera. Thus, if the aircraft has moved, with the elevation and azimuth drive motors being hefty enough, one can track the rapid target or aircraft movement.

It is well to remember that just positioning the target image at the center of the focal plane array does not necessarily point the laser beam to the appropriate point in space due to the tolerances involved in the laser pointing process. Thus to compensate for the errors for a particular angle of arrival one looks up the aim-point map and readjusts. In short, one can measure the X and Y displacements on the focal plane array between the image and the laser beam and use the values of the aim-point map look-up table to correct these measured displacements.

Figure 4A:
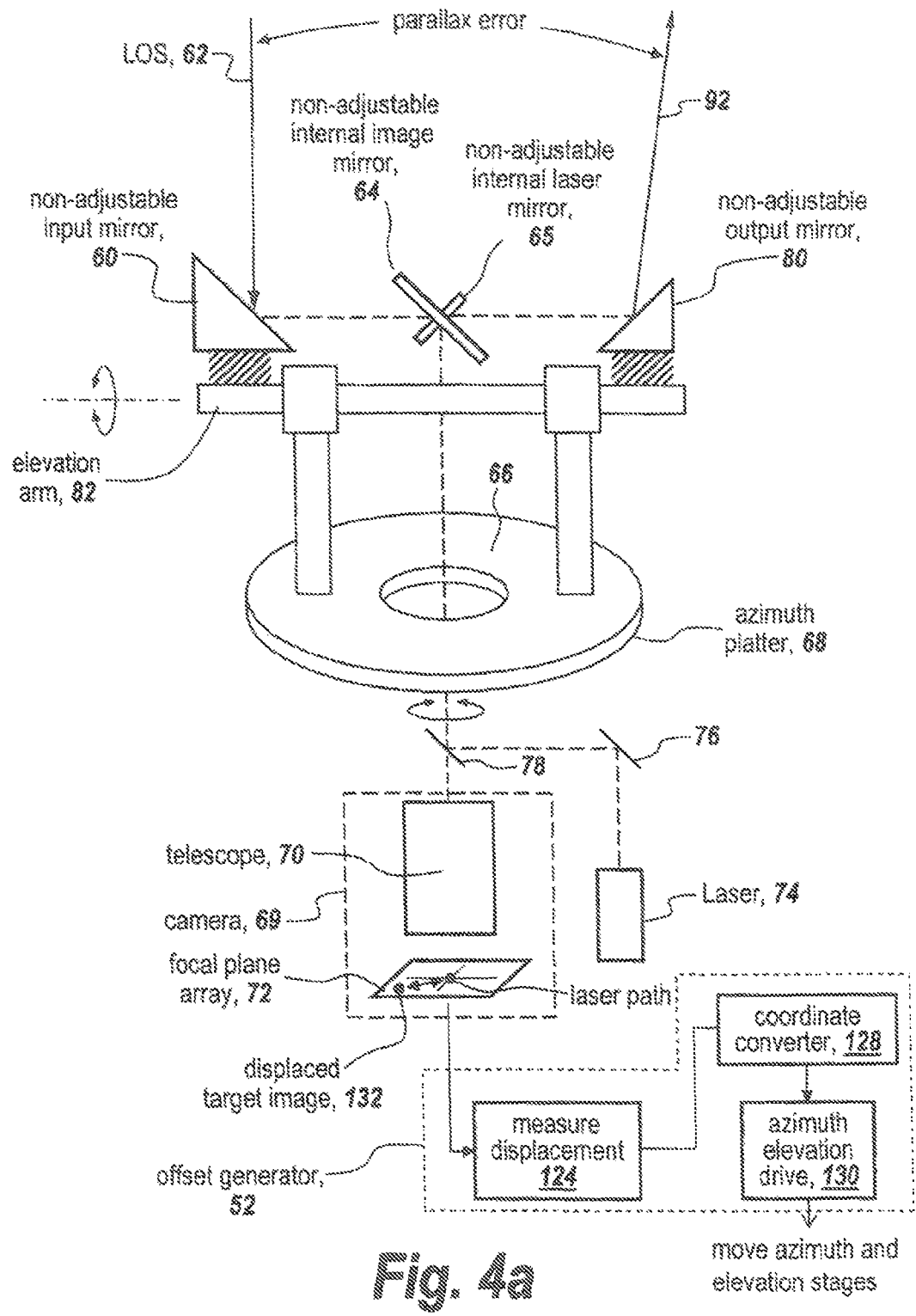
FIG. 4a is a diagrammatic illustration of the elements in the gimbal of FIG. 3 showing an elevation arm to which input mirror and output mirrors are fixedly attached, with the elevation arm carried on an azimuth platter to which the internal mirrors are fixedly attached, showing a target image displaced from the center of the focal plane array, also showing the parallax between the laser output beam and the line-of-sight to the target.

FIG. 4a depicts the hardware set illustrating the two paths: line-of-sight 62 or the image path to the target and laser path 92. The error in parallelism present between the two paths is labeled "parallax error". Here it can be seen that a non-adjustable input or image mirror 60 redirects the image coming in along line-of-sight 62 to non-adjustable mirrors 64 and 65, one of which redirects the image through an aperture 66 in an azimuth platter 68 and into a telescope 70 and onto a focal plane array 72. The telescope and focal plane array are part of camera 69.

Laser 74 has its beam redirected by mirrors 76 and 78 up through aperture 66 where it is redirected by internal mirror 65 onto the reflective surface of output mirror 80.

In the subject invention input mirror 60 and the output mirror 80 are fixedly attached to a rigid elevation arm 82 which rotates about the elevation axis. It is also noted that the elevation arm is mounted on azimuth platter 68, whereas internal mirrors 64 and 65 are fixedly attached to the azimuth platter as well, but not attached to the elevation arm.

It will thus be appreciated that mirrors 60, 64, 65 and 80 are non-adjustable and fixedly attached to their supports. Here, input mirror 60 and output mirror 80 are moved with the rotation of the elevation arm. Note that all the mirrors are moved with the rotation of the azimuth platter. Thus, the elevation arm as well as internal mirrors 64 and 65 attached to azimuth platter 68 are rotated with the azimuth platter coupled.

Figure 4B:
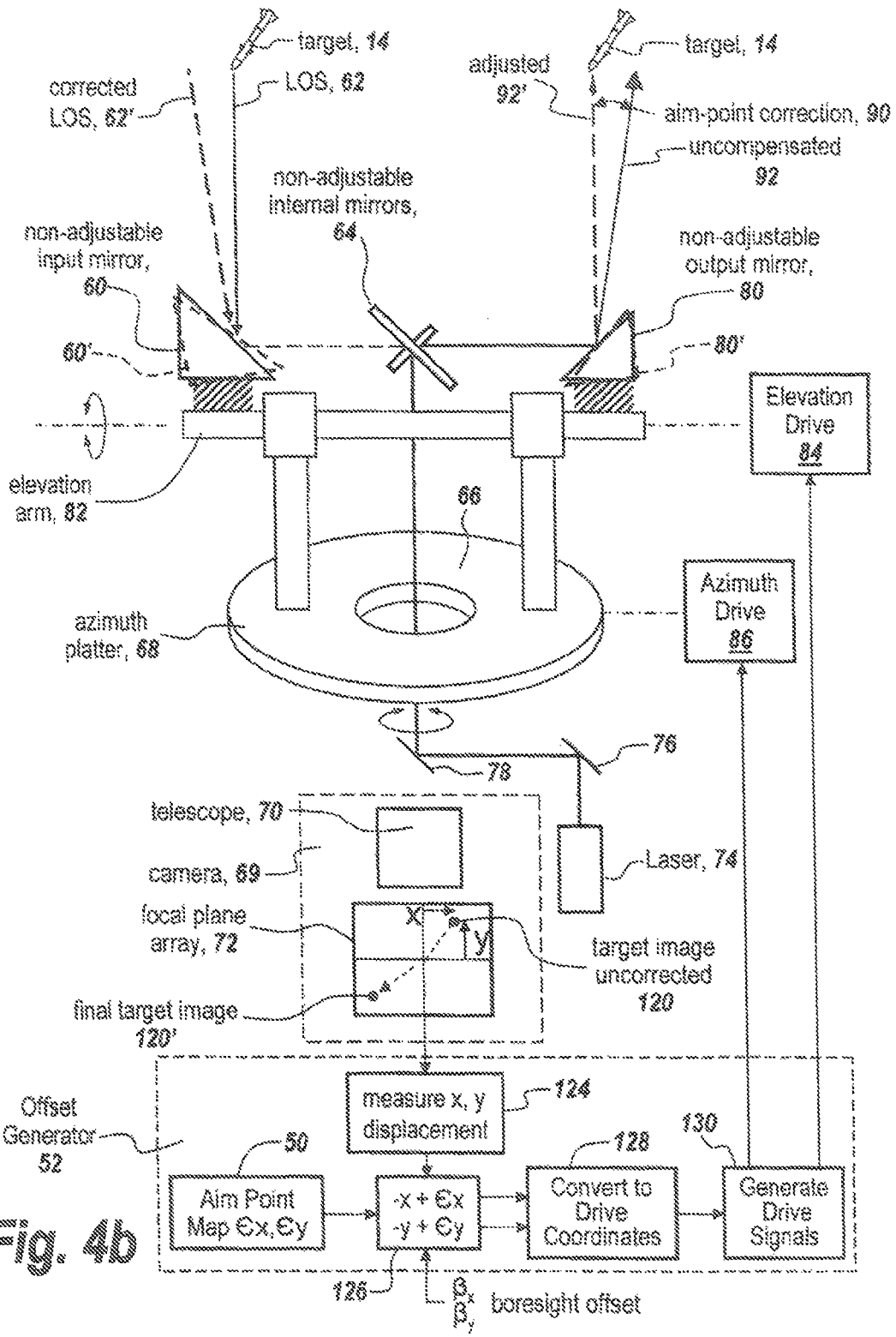
FIG. 4b is a diagrammatic illustration of the system of FIG. 4a, showing applying aim-point map corrections which are then converted to drive coordinates that are in turn used to generate azimuth and elevation drive signals to move the output mirror to correct for parallax errors and place laser energy on target.

As shown in FIG. 4b, target 14 is acquired from data supplied from the missile warning system. The gimbal 10 slews to the target location and an image of the target is acquired by camera 69 and focal plane array 72. At this point camera 69 starts to position the gimbal from data collected from the focal plane array. The uncorrected x, y target image coordinates of point 120 result in a displacement measured from the center of the focal plane array. This measurement as illustrated at 124 is added at 126 to the values from aim-point map 50 such that the uncorrected X and Y displacement is corrected and converted to drive coordinates at 128. These drive coordinates are coupled to an azimuth and elevation drive 130 that are then coupled to an azimuth drive 86 and an elevation drive 84 to reposition the output mirror 80 to provide correction 90 to beam 92. This establishes adjusted beam 92' to be parallel to line-of-sight 62. Since the repositioning of the output mirror also repositions the input mirror, a corrected line-of-sight 62' is established. This in turn moves the target image on the focal plane array to the final target image location 120'. With the repositioning of the output mirror, the laser is now firing at the target with great accuracy.

As shown in FIG. 4b, in order to rectify this situation, offset generator 52 is used to adjust both the elevation arm and the azimuth platter in accordance with measured X and Y displacements of the target image modified by the aim-point map values associated with the particular line-of-sight involved.

This causes the output and input mirrors to be repositioned as shown by dotted lines 80' and 60', such that rather than directing the laser beam 92 in the direction shown which is not where the target is, laser beam 92 is reflected by the moved output mirror 80' to now lie along beam path 92' parallel to line-of-sight 62. This places the laser energy on the target. In moving output mirror into position 80' the input or image mirror is also moved displacing the image from the center of the focal plane array to its final position as shown at 120'.

As will be appreciated, when a target image comes in on a detected line-of-sight, the aim-point map lookup table is accessed by angle and outputs the appropriate error values to offset generator 52 that stimulates the elevation arm drive and the azimuth platter drive to adjust the position of the mirrors. Thus, the measured errors from the initial alignment are used to reposition the output and input mirrors.

This eliminates the necessity of trying to adjust mirrors, or in fact trying to compensate on the fly for positional errors for all of the mirrors. In the subject invention, after manufacture, the positions of the mirrors are non-adjustable and compensation for pointing errors is under the control of the aim-point map generated in the calibration process.

As to the construction of the uni-construction elevation arm, referring to FIG. 5, elevation arm 82 is shown with input mirror 60 and output mirror 80 fixedly attached. The arm is carried on trunnions 94 and 96 for rotation about an elevation axis 98, in which the trunnions are fixedly attached to azimuth platter 68 which rotates about an azimuth axis 100.

Note that platter 68 is provided with a central aperture 102 through which the incoming path from the target passes and out of which the laser beam projects. As noted hereinafter, the camera including the telescope and focal plane array, as well as the laser are housed in gimbal housing 104.

Figure 6:
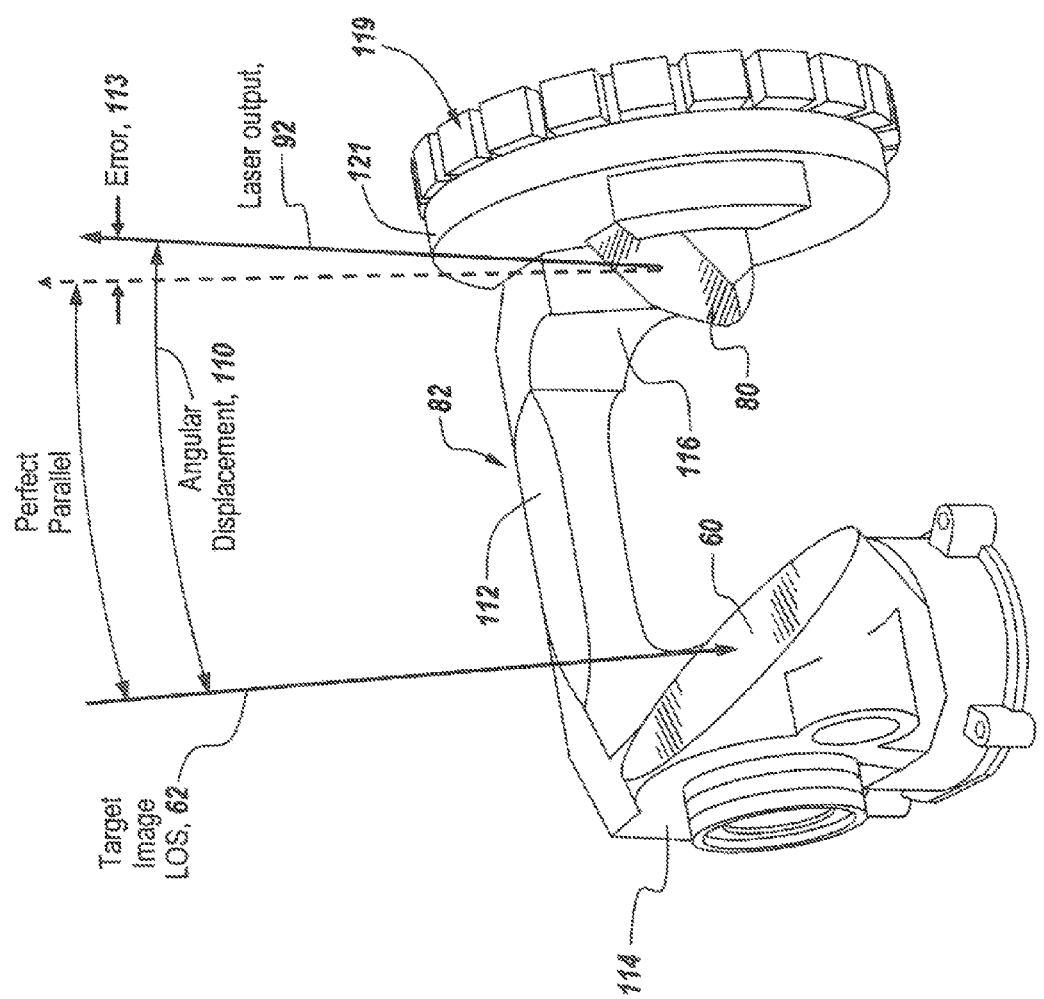
FIG. 6 is a diagrammatic illustration of the elevation arm of FIG. 5, illustrating the angular displacement between the line-of-sight to the target and the outgoing laser beam due to manufacturing tolerances in fabrication.

Referring now to FIG. 6, elevation arm 82 is shown in detail with input mirror 60 and output mirror 80 shown reflecting the target image that comes in over line-of-sight 62. If the mirrors are perfectly orthogonal to each other the angular displacement would be zero for the elevation arm only. However, creating a perfect elevation arm does not compensate for the remaining tolerances within the system. Here, the outgoing laser beam is reflected by output mirror 80 and is directed along a path 92. However, due to alignment errors and tolerances, there is an angular displacement 110 between the line-of-sight direction 62 and the direction 92 of the outgoing beam as shown by error 113.

Here it can be seen that uni-construction elevation arm 82 has a U-shaped portion 112 having legs 114 and 116 to which mirrors 60 and 80 are respectively attached. The elevation arm drive includes a motor 119 which is located on a disk 121 fixedly attached to arm 116 of elevation arm 82.

Figure 7:
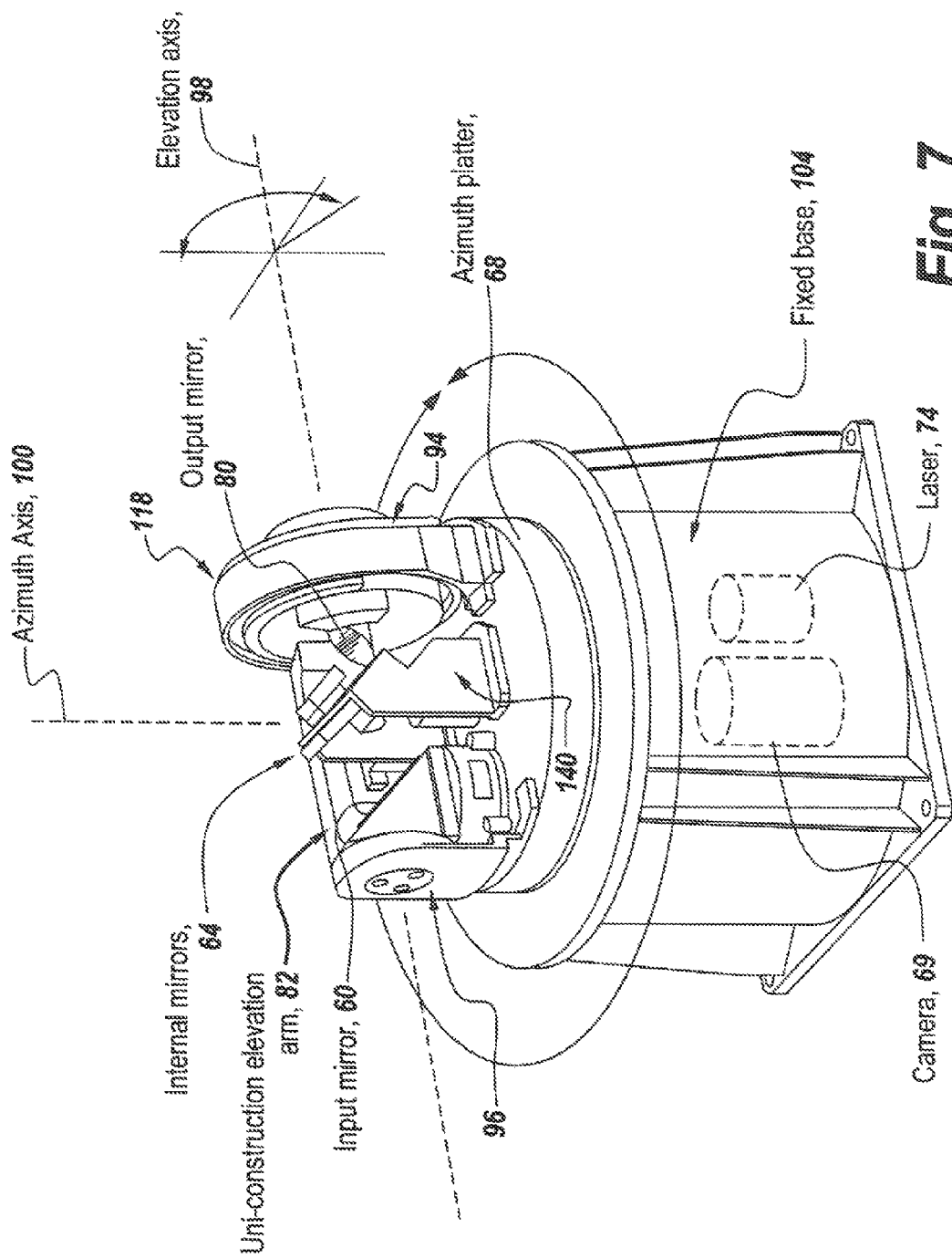
FIG. 7 is a diagrammatic illustration of the mounting of the uni-construction elevation arm of FIG. 6 on an azimuth platter, in which the elevation and azimuth stages are utilized first to center the target image on the focal plane array in a gimbal camera and then to aim the output of a laser to be parallel with the line-of-sight to the target.

Referring now to FIG. 7 in which like elements have like reference characters, what can be seen is that the uni-construction elevation arm 82 fixedly carries input mirror 60 and output mirror 80 and is mounted for rotation about elevation axis 98. Here the internal mirrors 64 are shown mounted to an assembly 140 fixedly mounted to azimuth platter 68.

As illustrated, camera 69 shown in dotted outline includes the aforementioned telescope and focal plane array, whereas the laser 74 is shown in dotted outline, all within gimbal housing 104.

Figure 8:
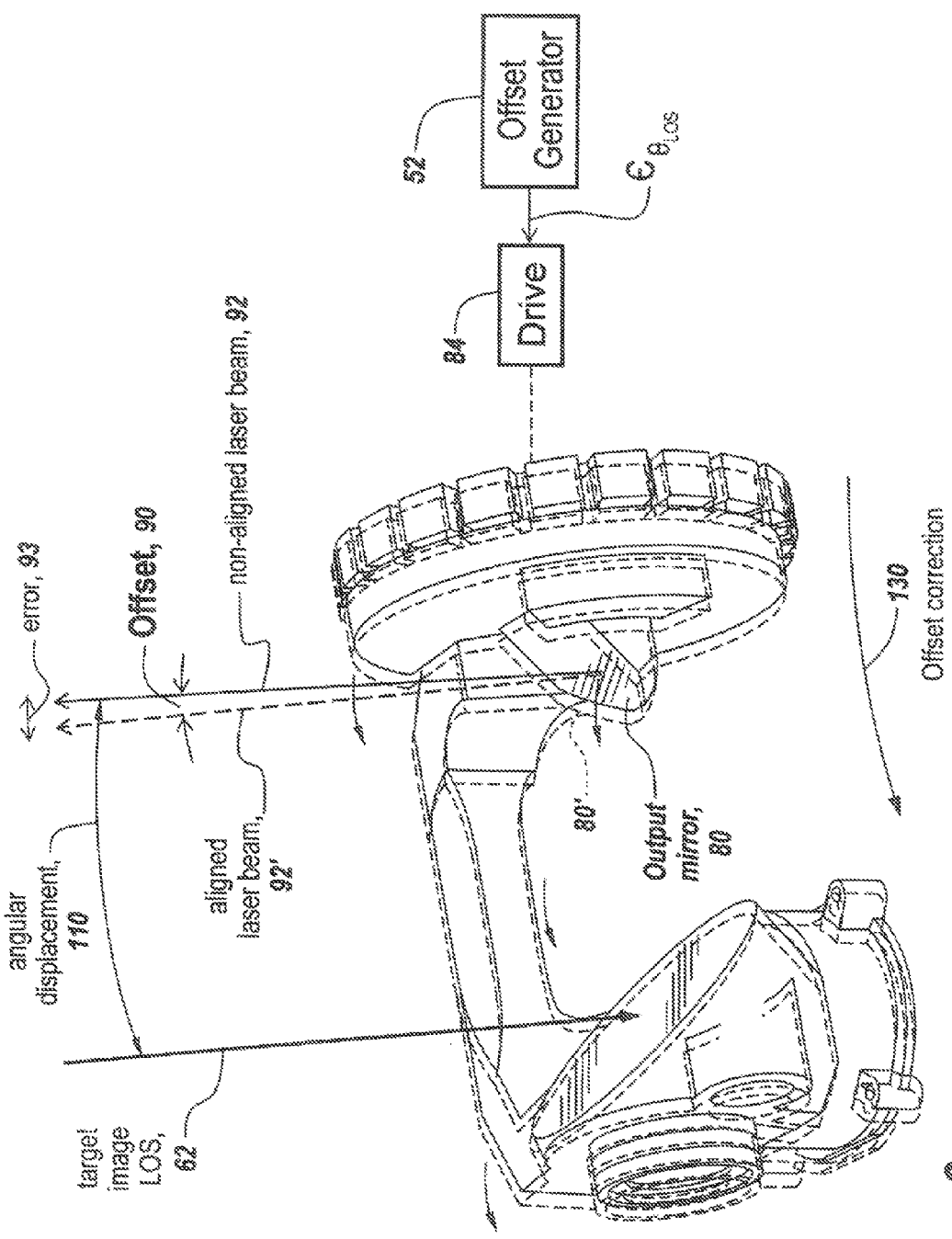
FIG. 8 is a diagrammatic illustration of the movement of the elevation arm subsequent to the imaging of a target on the focal plane array of FIG. 1 in which the output mirror is moved by the elevation arm and the azimuth platter by the offset established by the aim-point map, such that the laser beam is made to exit parallel to the line-of-sight to the target; and, FIG. 9 is a diagrammatic schematic of the boresight alignment system including a retro-return prism.

Referring now to FIG. 8, an original position of the elevation arm 82 is shown in which line-of-sight 62 and the resulting outgoing laser beam 92 are angularly displaced as illustrated by angular displacement 110. It is the purpose of the subject invention to be able to reposition output mirror 80 to cancel out any non-parallelity between these two beams to keep the angular alignment error within 200 microradians.

In accordance with the offset 90 for the elevation stage, output mirror 80 is adjusted in the direction of arrow 130 utilizing elevation drive 84, driven in accordance with the offset from aim-point error map 50 so that the angular position of mirror 80 is changed to the indicated by dotted line 80'. Likewise, laser beam 92 is shifted by the repositioning of the output mirror 80 into its aligned position at 92'.

As can be seen, the entire elevation arm is rotated either by the elevation drive or the azimuth platter drive, or both, such that it is altered in position as illustrated by the dotted outlines shown.

The result is that with an angle of arrival established for the target image, the aim-point map is used to provide offsets to the elevation and azimuth drives to adjust the output mirror in accordance with the previously determined offset for the particular gimbal involved.

Figure 9:
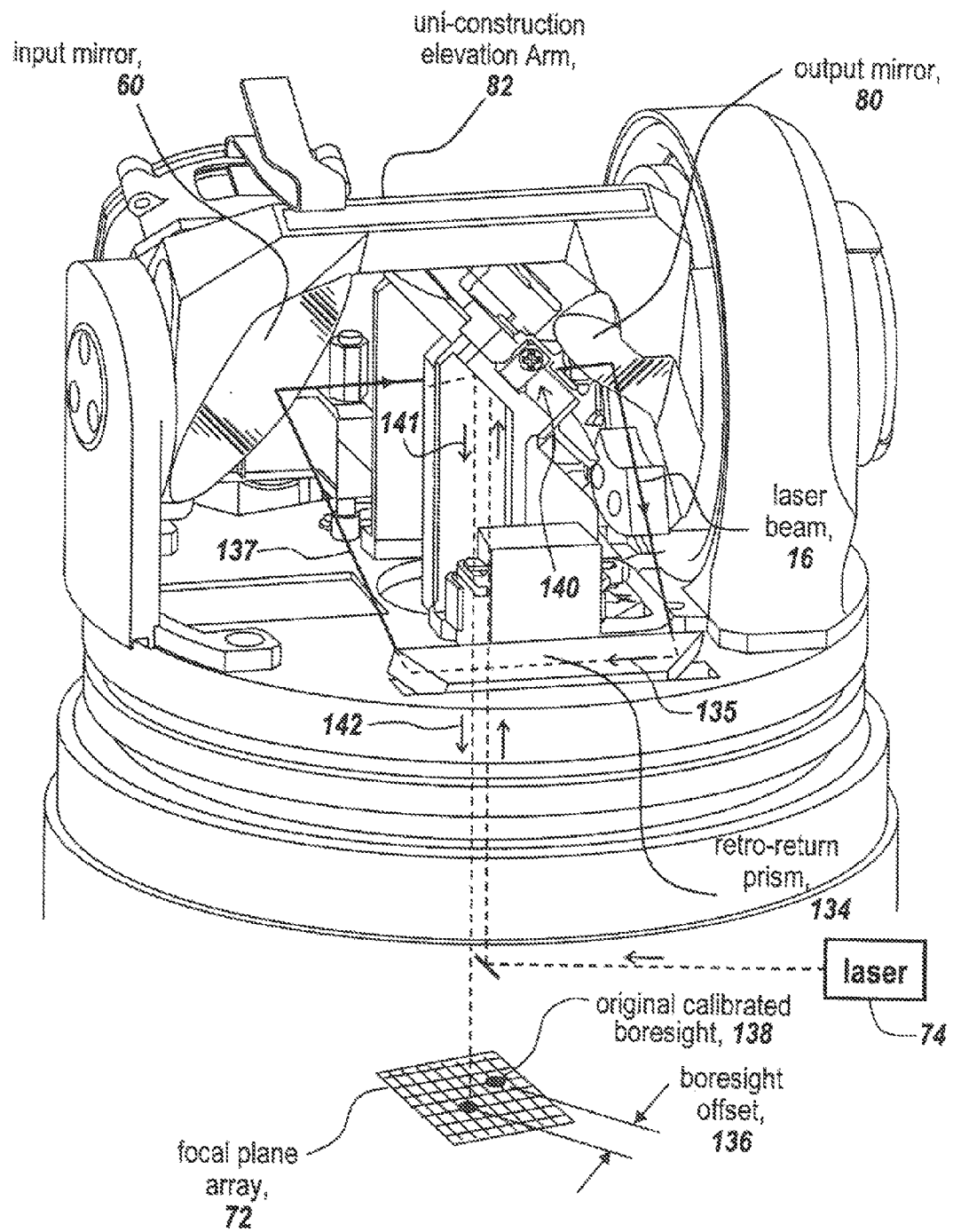

As to the boresighting subsystem and referring to FIG. 9, at initial aim-point map calibration a reference boresight point is taken establishing the reference point with which to compare other periodic firings. At a pre-determined period the boresight is checked and the offset recorded. If there is a change to the boresight value this indicates a change to the aim-point and that value is added onto the aim-point map value as illustrated in FIG. 4b at βx and βy.

FIG. 9 illustrates the mechanism that allows the laser to fire back into the gimbal and strike the focal plane array. The elevation arm 82 is positioned below the field of regard using a hard stop to maintain consistency. This points the input mirror 60 and the output mirror down toward a retro-return prism 134. The azimuth is driven to three determined spots and the laser is fired at each spot. As illustrated, the laser beam 16 strikes the output mirror 80 which is aimed at retro-return prism 134. The laser beam passes through the prism as illustrated by arrow 135 and exits pointing towards the input mirror 60 as illustrated by arrow 137. The reflective surface of input mirror directs the laser beam back into the gimbal via a fixed turning mirror as illustrated by arrows 141 and 142 down to focal plane array 72.

In one embodiment, the original calibration boresight image 138 on the focal plane array 72 was taken at the same time the aim-point map was generated. If there were no thermal gradients, each time a subsequent boresight alignment is attempted the laser beam would come back to the same point on the focal plane array. However, in the face of thermal gradients the returned laser beam is offset on the focal plane array by an offset 136. This offset is recorded and as illustrated in FIG. 4b, the boresight corrections βx and βy are added to the aim-point values to compensate for temperature gradients. Note that the boresight alignment may be periodically commenced before an engagement.

An appendix is provided which describes the source code used in the subject invention.

It will be appreciated that the drive for the two axis gimbal described herein is available commercially off-the-shelf from a variety of different vendors.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

```
/****************************************************************
******
********
//         FUNCTION:    Aim-Point_Map_correction
//
//         PURPOSE:     The purpose of this function is to perform boresight
correction
//                      on the polar coordinate inputs using the aim-point map
data.
//
//
//                                      0       1
//                                    +-------+
//                                    |   x   |
//                                    +-------+
//                                      2       3
//
//         NOTES:       Boresight values will be set to zero until the target
is
//                      centered within a 32x32 window. Then first time,
values will
//                      be limited, after that boresight table values will be
used.
//
****************************************************************
******
******/
struct cmd_az_el Boresight_correction(float TgtTnterceptAz, float
TgtInterceptE1)
{
        float azoffset, eloffset, Sumaz_el;
        float finalValueaz, finalValueel, TargetAz, TargetE1;
        struct cmd_az_el ATMPT, APOINT;

/* Convert from radians to degrees */
        TargetAz = TgtInterceptAz * RAD2DEG;
        TargetE1 = TgtInterceptE1 * RAD2DEG;

/* Detemine the 2 closest index points in the boresight table,
one
        greater and one smaller than the point. Do for az and el */
        /* Point 0 */
        POINTS [0] .az = (int)  ((TargetAz/5) + 36);    /* 180/5 = 36     */
        POINTS [0] .el = (int)  ((TargetE1/5) + 6);     /* 30/5 = 6       */

/* Point 1 */
        POINTS [1] .az = POINTS [0] .az +1;
        POINTS [1] .el = POINTS [0] .el;

/* Point 2 */
        POINTS [2] .az = POINTS [0] .az;
        POINTS [2] .el = POINTS [0] .el +1;

/* Correct for those points on the table edge */
        if (POINTS [0] .az == 72)   {
            POINTS [1] .az = 72;
        }
        else if (POINTS [0] .az == 0)   {
            POINTS [1] .az = 0;
        } if (POINTS [0] .el == 0)   {
            POINTS [2] .el = 0;
        }
        else if (POINTS [0]. el == 24)   {
            POINTS [2] .el = 24;
        }

/* Point 3 */
        POINTS [3] .az = POINTS [1] .az;
        POINTS [3] .el = POINTS [2] .el;

/* Determine the intercept percentage az and el offset from point
one.   First convert POINT [x] .az index to degrees, az table index 2 is -
170     degrees */
```

```
        azoffset = (TargetAz - (POINTS [0] .az * 5 - 180)) /5;
        eloffset = (TargetEl - (POINTS [0] .el * 5 - 30)) /5;

finalValueaz = ((1-azoffset) * (1-eloffset) *
            BORESIGHT_TBL.tbl [POINTS [0] .el] [POINTS [0] .az] .az) +
            (azoffset * (1-elloffset) *
            BORESIGHT_TBL.tbl [POINTS [1] .el] [POINTS [1] .az] .az) +
            (azoffset * eloffset *
            BORESIGHT_TBL.tbl [POINTS [3] .el] [POINTS [3] .az] .az) +
            ((1-azoffset) * eloffset *
            BORESIGHT_TBL.tbl [POINTS [2] .el] [POINTS [2] .az] .az) ;

finalValueel = ((1-azoffset) * (1-eloffset) *
            BORESIGHT_TBL.tbl [POINTS [0] .el] [POINTS [0] .az] .el) *
            (azoffset * (1-eloffset) *
            BORESIGHT_TBL.tbl [POINTS [1] .el] [POINTS [1] .az] .el) *
            (azoffset * eloffset *
            BORESIGHT_TBL.tbl [POINTS [3] .el] [POINTS [3] .az] .el) +
            ((1-azoffset) * eloffset *
            BORESIGHT_TBL.tbl [POINTS [2] .el] [POINTS [2] .az] .el) ;

/ * Sum the angles in radians * /
        Sumaz_el = TgtInterceptAz + TgtInterceptEl;

/ * Calculate offset aimpoint * /
        AIMPT.az = finalValueez + AUTO_DIFS.gimbaltube.X +
            (AUTO_DIFS.mirror.X * cos (Sumaz_el)) +
            (AUTO_DIFS.mirror.Y * sin (Sumaz_el)) ;

ATMPT.el = finalValueel + AUTO_DIFS.gimbaltube.Y +
            (AUTO_DIFS.mirror.Y * cos (Sumaz_el)) -
            (AUTO_DIFS.mirror.X * sin (Sumaz_el));

/ * Zero boresight values until target is centered in 32x32 window
* /
        if (!LaserOffsetMode)   {
            APOINT.az = 0.0;
            APOINT.el = 0.0;
        }
        / * when switching to laser offset. limit max offset on first
usage    * /
        else {
            if (LimitFlag) {
                if (fabs (AIMPT.az) > PIXELOFFSETLIMIT) {
                    AIMPT.az *= divider;
                }
                if (fabs (ATMPT.el) > PIXELOFFSETLIMIT) {
                    AIMPT.el *= divider;
                }
                divider += 0.1;
                if (divider > 1.0) {
                    LimitFlag = FALSE;
                }
            }

/ * Convert pixedl aimpoint to radians * /
            APOINT.az = PIXEL2RAD * AIMPT.az;
            APOINT.el = PIXEL2RAD * AIMPT.el/
        } return (APOINT);
}
/ * * * * * * * * * * * * * * * * * * * * * * * * * * * * * * * * * * * * * * * * * * * * * * * * * * * * * *
* * * * * *
* * * * * *
//          FUNCTION:       Autoboresight_processing
//
//          PURPOSE:        The purpose of this function is to handle
autoboresight
//                          processing for four angles. This is done after each
boresight
//                          position commanded by the IPC and at pbit and cbit.
//
//          NOTES:
//
* * * * * * * * * * * * * * * * * * * * * * * * * * * * * * * * * * * * * * * * * * * * * * * * * * * * * *
* * * * * *
* * * * * * /
void Autoboresight_processing (void)
{
```

```
            int sindex, Bad_value_flag= FALSE;
            float autoAzvalue, autoElvalue, rota;
            double eltotal=0, aztotal = 0, totAZpts=0, totELpts=0,
aveAZpts=0,         aveELpts=0;
            double totSQazpts=0, totSQelpts=0;
            double newaz, newel;
            unsigned char err;

/* It has taken too long to collect autoboresight data, timeout
is 3secs*/
            if (End_autoboresight_timeout ==0)
            {
                Bad value flag = TRUE;
                printf ("aE ");
            }
            else
            {
                /* if (target is centered in 100x100 pixels) {*/
                if (fabs(TRACK_PROCESSOR_RPT.targetl_boresight_X) <= 128.0
&&
                    fabs(TRACK_PROCESSOR_RPT.targetl_boresight_Y) <= 128.0)
                {
                    /* Target is centered in both az and el, save the
values */
                    tgt_pos[auto_sample_index] .az =
                        TRACK_PROCESSOR_RPT.targetl_boresight_X;
                    tgt_pos[auto_sample_index] .el =
                        TRACK_PROCESSOR_RPT.targetl_boresight_Y;
                    auto_sample_index++;
                    /* Are NUMOFTPSAMPLES collected */
                    if (auto_sample_index > (NUMOFTPSAMPLES))
                    {
                        /* else get autoboresight values for current
angle */
                        autoAzvalue =
AUTO_ANGLES.angle [current_angle] .az;
                        autoElvalue =
AUTO_ANGLES.angle [current_angles] .el;
                        /* Determine how much each sample varies from
                            autoboresight values */
                        for (sindex=1; sindex < NUMOFTSAMPLES+1;
sindex++)
                        {
                            aztotal += tgt_pos [sindex] .az =
autoAzvalue;
                            eltotal += tgt_pos [sindex] .el =
autoElvalue;
                        }

/* Store average variation over the
NUMOFTPSAMPLES            samples */
                        averageAz [current_angle] = aztotal /
NUMOFTPSAMPLES;
                        averageEl [current_angle] = eltotal /
NUMOFTPSAMPLES;
                        /* Calculate standard deviation - UPDATE -
                        get average */
                        for (sindex=1; sindex < NUMOFTSAMPLES+1;
sindex++)
                        {
                            totAZpts += tgt_pos [sindex] .az;
                            totELpts += tgt_pos [sindex] .el;
                        }
                        aveAZpts = totAZpts / NUMOFTPSAMPLES;
                        aveELpts = totELpts / NUMOFTPSAMPLES;

eltotal = 0;
                        aztotal = 0;
                        for (sindex=1; sindex < NUMOFTPSAMPLES+1;
sindex++)
                        {
                            aztotal += pow ((tgt_pos [sindex] .az -
aveAZpts), 2);
                            eltotal += pow ((tgt_pos [sindex] .el -
aveELpts), 2);
                        }
                        if (sqrt (aztotal/(NUMOFTPTSAMPLES -1)} > 0.250
```

```
                    sqrt (eltotal/ (NUMOFTPSAMPLES -1)) > 0.250)
                    {
                        err = 88;       /* exceeded standard
deviation */
                        send_Health_IPC (err);
                    }
                    totAZpts = 0.0;
                    totELpts = 0.0;
                    totSQazpts = 0.0;
                    totSQelpts = 0.0;

/* Calculate standard deviation - UPDATE -
                    get average */
                    for (sindex=1; sindex < NUMOFTSAMPLES+1;
sindex++)
                    {
                        totAZpts += tgt_pos [sindex] .az;
                        totELpts += tgt_pos [sindex] .el;
                        totSQazpta += pow [tgt_pos [sindex] .az ,
2);
                        totSQelpts += pow (tgt_pos [sindex] .e1 ,
2);
                    }
                    newaz = pow (totAZpts, 2) / NUMOFTSAMPLES;
                    newel = pow (totELpts, 2) / NUMOFTSAMPLES;

if (((sqrt (totSQazts - newaz) /
                        sqrt (NUMOFTPSAMPLES -1)) > 0.250) | |
                        ((sqrt (totSQelpts - newel) /
                        sqrt (NUMOFTPSAMPLES -1)) > 0.250))
                    {
                        err = 88;       /* exceeded standard
deviation */
                        send_Health_IPC (err);
                    }
                }       /* if auto_sample_index <= (NUMOFTSAMPLES -1)
*/
                /* Haven't collected all samples yet */
                else
                {
                    return;
                }
            } /* if centered */
            else    /* Can't collect samples until centered */
            {
              return;
            }
        } /* End_autoboresight timer = 0 */
        /* Stop collecting because finished or wait until ready for next
angle */
        process_outgoing_LI_messages (STOP_BORE);
        Autoboresight_collect = FALSE;
        TPstate = STNDBY;
        processs_outgoing_TP_messages (AUTOTRACK, DISARM);

/* Finished processing for current angle, increment to next angle
*/
        current_angle++;

/* Are there more angles to process */
        if (current_angle < 4)
        {
            if (Autoboresight_in_progress)
            {
                AutoWaittimer = 44; /* 11 seconds delay */
                End_autoboresight_timeout = 0; /* reset to zero */
                auto_sample_index =0;
            }
        }
        /* All 4 angles been processed */
        else
        {
            /*threat_processing (HOME. 0); */
            Autoboresight_timeout = 0;
            End_autoboresight_timeout =        0; /* reset to zero */
            /* auto frame position and integ */
            process_outgoing_TP_messages (9, 5);
            Autoboresight_in_progress = FALSE;
            if (Bad_value_flag)
```

```
            {
                send_Alert_IPC (BAD_AUTOBORESIGHT_DATA);
            }
            else
            {
                eltotal = 0;
                aztotal = 0;

/ * Calculate autoboresight correction attributable to
tube * /
                AUTO_UPDATE.tube_value.az = (averageAz [angle1] +
                        averageAz [angle2] +
                    averageAz [angle3] + averageAz [angle4])/4;
                AUTO_UPDATE.tube_values.el = (averageE1 [angle1] +
                        averageEl [angle2] +
                    averageEl [angle3] + averageEl [angle4])/4; ;
                / * Calculate standard deviation for Azimuth * /
                if (sqrt ( (
                    pow ( (averageAz [angle1] −
AUTO_UPDATE.tube_values.az), 2) +
                    pow ( (averageAz [angle2] −
AUTO_UPDATE.tube_values.az), 2) +
                    pow ( (averageAz [angle3] −
AUTO_UPDATE.tube_values.az), 2) +
                    pow ( (averageAz [angle4] −
AUTO_UPDATE.tube_values.az), 2) ) /4)
                    > 0.250)
                {
                        err = 88; / * exceeded standard deviation * /
                        send_Health_IPC (err);
                }

/ * Calculate standard deviation for Evalution * /
                else if (sqrt ( (
                    pow ( (averageEl [angle1] −
AUTO_UPDATE.tube_values.el), 2) +
                    pow ( (averageEl [angle2] −
AUTO_UPDATE.tube_values.el), 2) +
                    pow ( (averageEl [angle3] −
AUTO_UPDATE.tube_values.el), 2) +
                    pow ( (averageEl [angle4] −
AUTO_UPDATE.tube_values.el), 2) ) /4)
                    > 0.250)
                {
                        err = 88; / * exceeded standard deviation * /
                        send_Health_IPC (err);
                }
                / * Calculate autoboresight correction attributable to
mirrors * /
                aztotal = ( (averageAz [angle1] -
AUTO_UPDATE.tube_values.az) −
                    (averageAz [angle3] - AUTO_UPDATE.tube_values.az) −
                    (averageEl [angle2] - AUTO_UPDATE.tube_values.el) +
                    (averageEl [angle4] - AUTO_UPDATE.tube_values.el) ) / 4;

eltotal = ( (averageEl [angle1] −
AUTO_UPDATE.tube_values.el) −
                    (averageEl [angle3] - AUTO_UPDATE.tube_values.el) −
                    (averageAz [angle2] - AUTO_UPDATE.tube_values.az) +
                    (averageAz [angle4] - AUTO_UPDATE.tube_values.az) ) / 4;

rota = (Auto_Starting_Az + Auto_Starting_El) *
DEG2RAD;
                AUTO_UPDATE.mirror_values.az =
                    (aztotal * cos (− rotal) ) + (eltotal * sin (− rotal) ) ;
                AUTO_UPDATE.mirror_values.el =
                    (eltotal * cos (− rotal) ) − (aztotal * sin (− rotal) ) ;
                threat_processing(AUTO_UP, 0);
                send_Autoboresight_Update_IPC ( ) ;
            }
        }
    }
```

What is claimed is:

1. A method for minimizing the angular displacement of a laser beam from a gimbal with respect to a line-of-sight from the gimbal to a target, comprising:

for a given gimbal, during a calibration, measuring the angular error between the output laser beam and the line-of-sight to a fiducial target for a number of different line-of-sight angles with respect to the gimbal; and, repositioning an output mirror to make the output beam parallel with the line-of-sight to a real target utilizing an offset generated from an aim-point map into which is recorded the angular displacement error associated with each of a number of different lines of sight corresponding to different line-of-sight angles to the fiducial target, whereby parallelism is achieved through repositioning of the output mirror after real target acquisition, as opposed to individually adjusting any of the mirrors in the gimbal to achieve alignment.

2. The method of claim 1, wherein the gimbal includes an input mirror, the output mirror and internal mirrors, and further including the step of locking down all of the mirrors to the gimbal in a non-adjustable fashion, whereby complicated mirror adjustments to provide alignment are avoided.

3. The method of claim 2, and furthering including the step of fixedly mounting the input and output mirror at opposite ends of a uni-construction elevation arm mounted for rotation about the elevation axis of the gimbal, whereby the output and input mirrors are repositioned in part by driving the elevation arm in accordance with the offset from the aim-point map.

4. The method of claim 3, wherein the repositioning of the output mirror includes driving the azimuth platter in accordance with the offset from the aim-point map.

5. The method of claim 1, wherein the output mirror is repositioned in accordance with the combined movement of the elevation arm and the azimuth platter in accordance with the offset from the aim-point map.

6. The method of claim 1, wherein the initialization procedure includes mounting a fixed reflective target distance from the gimbal and rotating the gimbal so as to establish a number of line-of-sight angles to the fixed reflective target and the gimbal; and recording the error between the return from the fixed reflective target image on the focal plane array and the image of the fixed reflective target on the focal plane array such that the errors are recorded in the aim-point map referenced to the line-of-sight angle, whereby the errors are accessible by line-of-sight angles from the aim-point map.

\* \* \* \* \*